US010877558B1

United States Patent
Zhao

(10) Patent No.: US 10,877,558 B1
(45) Date of Patent: Dec. 29, 2020

(54) WEARABLE GESTURE INPUT DEVICE USING ELECTRIC IMPEDANCE MEASUREMENT

(71) Applicant: Facebook Technologies, LLC, Menlo Park, CA (US)

(72) Inventor: Yi Zhao, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 26 days.

(21) Appl. No.: 16/164,640

(22) Filed: Oct. 18, 2018

Related U.S. Application Data

(60) Provisional application No. 62/647,560, filed on Mar. 23, 2018, provisional application No. 62/636,699, filed on Feb. 28, 2018.

(51) Int. Cl.
  *G06F 3/01* (2006.01)
  *G06K 9/00* (2006.01)
  *G06F 1/16* (2006.01)

(52) U.S. Cl.
  CPC ............. *G06F 3/014* (2013.01); *G06F 1/163* (2013.01); *G06F 3/017* (2013.01); *G06K 9/00355* (2013.01)

(58) Field of Classification Search
  CPC .......... G06F 3/014; G06F 3/017; G06F 1/163; G06K 9/00355
  See application file for complete search history.

(56) References Cited

U.S. PATENT DOCUMENTS

| 10,365,882 | B2* | 7/2019 | Shin ................. G06F 3/147 |
| 2015/0227245 | A1* | 8/2015 | Inagaki .............. G09G 5/003 345/173 |
| 2016/0011668 | A1* | 1/2016 | Gilad-Bachrach ..... G06F 3/017 345/156 |
| 2016/0306932 | A1* | 10/2016 | Fateh ................ G06F 19/3456 |
| 2016/0313798 | A1* | 10/2016 | Connor ................ G06F 3/017 |
| 2017/0090865 | A1* | 3/2017 | Armstrong-Muntner ....................G10L 25/51 |
| 2019/0286232 | A1* | 9/2019 | De Nardi ............ G06F 1/163 |

* cited by examiner

*Primary Examiner* — Muhammad N Edun
(74) *Attorney, Agent, or Firm* — Fenwick & West LLP

(57) ABSTRACT

A hand tracking system includes a wearable device configured to be worn on a user's wrist. The wearable device includes one or more transmitters, at least one receiver, and a controller. The transmitters generate an electric field that is altered by movement of a hand, fingers, and/or wrist of the user. The wearable device may also include one or more microphones that are configured to detect taps and so forth by one or more fingers of the hand. In some embodiments, the microphones are positioned such that they detect the taping my monitoring acoustic waves propagating through the tissue of the hand. The controller uses information captured by the receivers and/or the microphones and a model (e.g., machine learning model) to recognize a hand gesture.

20 Claims, 6 Drawing Sheets

WEARABLE GESTURE INPUT DEVICE USING ELECTRIC IMPEDANCE MEASUREMENT

CROSS-REFERENCE TO RELATED APPLICATIONS

This application claims the benefit of U.S. Application No. 62/647,560, filed Mar. 23, 2018 and U.S. Application No. 62/636,699, filed Feb. 28, 2018, which are incorporated by reference in their entirety.

BACKGROUND

Field of the Disclosure

The present disclosure generally relates to hand tracking for input gesture identification using transducers, and specifically to tracking of human hand positions using electric impedance measurement.

Description of the Related Arts

Bodily motion such as hand gestures can be an appealing way for a user to interact with computing devices, since gestures are already a natural part of how people communicate. A hand gesture tracking device may enable a user to control or interact with computing devices without physically touching them. For example, a gesture tracking device may be used by a user to control memory or display devices in a local or remote environment.

Gesture recognition systems can be unwieldy, constraining, and uncomfortable to use. For example, glove-like devices that use mechanical signals to track hand motion may disturb the haptic sense of the hand. They may also be difficult to customize to different users having varying hand size. Camera-based gesture tracking systems detect the user's hand area from captured images, but often require the user's entire hand to be in the camera view range. They may also suffer failure when there is object occlusion in an image.

Thus, gesture trackers can be awkward to use, difficult to manage, and subject to distortion from the system arrangement or surrounding environment. The cost of traditional gesture trackers may also be high, thus limiting user adoption rate. Furthermore, gesture recognition systems are limited to a small set of predefined gestures. For these and other reasons, such gesture recognition systems are unsuitable for effective hand tracking for head-mounted displays (HMDs).

SUMMARY

A hand tracking system includes a wearable device configured to be worn on a user's hand or wrist that includes at least one transducer (e.g., one or more transmitters and at least one receiver) and a controller. The transducers generate an electric field that is altered by movement of a hand, fingers, and/or wrist of the user or when the user touches another part of their body or other conductive object. The controller uses information captured by the transducers and a model (e.g., machine learning model) to recognize a hand gesture made by the hand of the user that is mapped to an input on a host device (e.g., an augmented reality or virtual reality HMD).

The wearable device, in one embodiment, may additionally include one or more microphones configured to detect taps by the one or more fingers of the hand, hand-to-hand contact, or hand-to-object contact. In some embodiments, the microphones are positioned against the skin of the user such that the microphones detect the taps and other contact between the hand and other objects by monitoring acoustic waves propagating through the tissue of the hand. Using the model, the controller uses the electric field information captured by the transducers and the acoustic wave information observed by the microphones to derive an output that describes the hand gesture made by the user.

The machine learning model is trained, in one embodiment, by observing alterations in the electric field caused by a number of different positions of the hand and fingers in a training mode. Simultaneously, acoustic waves traveling through the tissue of the user's hand are observed for each of the number of different positions. Accordingly, unique or otherwise identifiable features of the electric field and/or acoustic waves for the different hand gestures are extracted and used to train the machine learning model to determine a hand gesture based on the observed alterations in the electric field, the acoustic wave propagation signatures, and their corresponding hand gestures.

BRIEF DESCRIPTION OF THE DRAWINGS

The teachings of the embodiments can be readily understood by considering the following detailed description in conjunction with the accompanying drawings.

The figures depict various embodiments for purposes of illustration only.

DETAILED DESCRIPTION

In the following description of embodiments, numerous specific details are set forth in order to provide more thorough understanding. However, note that the embodiments may be practiced without one or more of these specific details. In other instances, well-known features have not been described in detail to avoid unnecessarily complicating the description.

Embodiments are described herein with reference to the figures where like reference numbers indicate identical or functionally similar elements. Also in the figures, the left most digits of each reference number corresponds to the figure in which the reference number is first used.

Embodiments relate to a wearable device for tracking a hand gesture of a hand of a user using electric impedance measurement. Transducers (e.g., receivers and transmitters, an electrical antenna array, electrical sensor and emitter, etc.) located on the device may generate an electric field that is altered by movement of a hand and/or fingers of the user. The electric field measurements or signals received by the transducers can vary, and correspond to the hand movement and position of the user. Features may be extracted from the electric signals. For example, the electric signals can be processed by a neural network using a machine learning model, which may be trained to programmatically detect a hand gesture that corresponds to the electric signals.

Example View of Wearable Device

Figure 1:
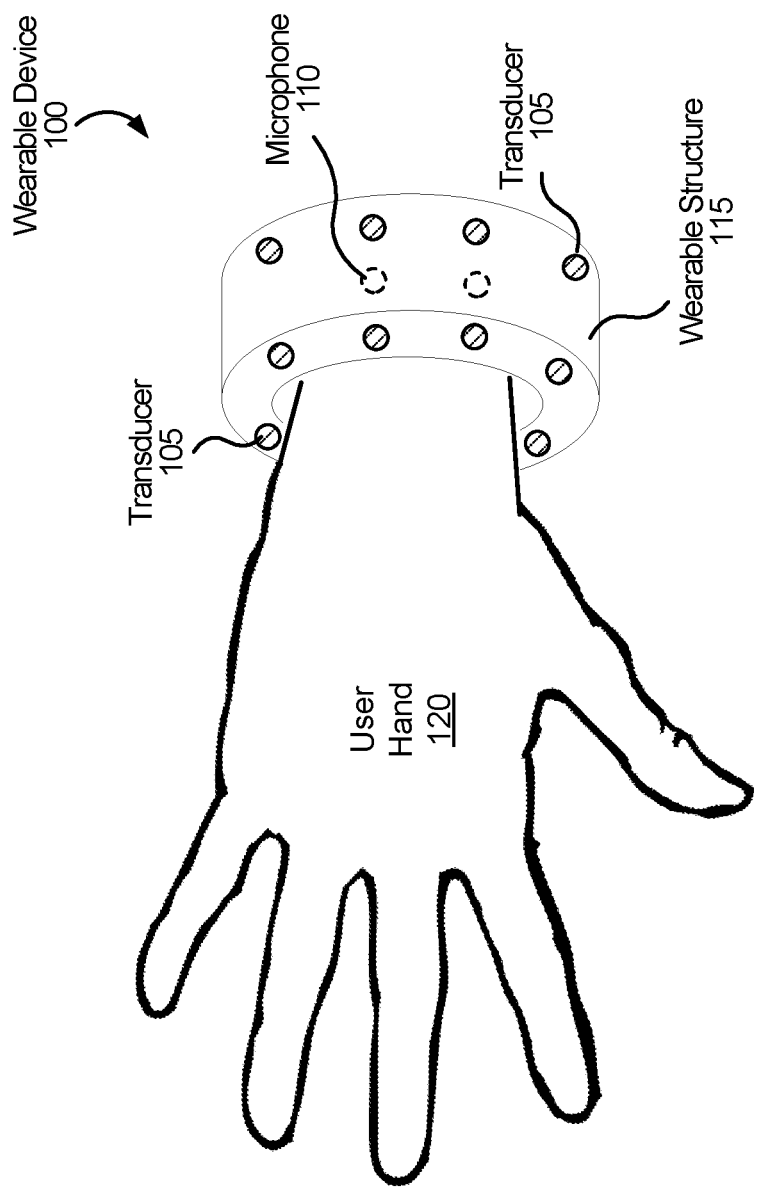
FIG. 1 is an example view of a wearable device including a plurality of transducers and microphones, in accordance with an embodiment.

FIG. 1 is an example view of a wearable device 100 that includes transducers 105 and microphones 110, in accordance with an embodiment. The wearable device 100 includes a wearable structure 115 that may be a flexible mechanical substrate such as a plastic (e.g., polyethylene or polypropylene), rubber, nylon, synthetic, polymer, etc. The wearable structure 115 is configured to be worn around at least a portion of a user's wrist or arm. The wearable device 100 includes transducers 105 and one or more microphones 110 arranged at different locations on the wearable structure 115.

The wearable device 100 is placed on a user's arm to detect a hand gesture made with the hand 120 of the user. As used herein, a hand gesture is any combination of position, pose, or movement of the hand and fingers including symbols, tapping, sounds and/or motion, as illustrated and described in more detail below with respect to FIG. 3.

The wearable device 100 may be portable, light weight, and low power, and is suitable for use as a game controller, media controller, keyboard controller, robotic device controller, etc. The wearable device 100 may include micro-USB, Bluetooth®, or Wi-Fi connectivity to interface with a computing device, a VR system, or an HMD. In some embodiments, the wearable device 100 may be used to render a full hand model in a VR system or track human-object interaction in real environments.

The transducer 105 may each operate as a receiver or a transmitter and, in some embodiments, may alternate between operating as a receiver and a transmitter. In some embodiments, pairs of transducers operate together, with some transducers operating as transmitters and others operating as receivers. The transducers can be arranged in a pattern along an inner surface of the wearable structure 115 facing the arm or wrist such that the transducers are in electric contact with the arm or wrist. In this instance, the transducers 105 may capacitively couple with the skin of the user. However, there are instances where it may be desirable for there to be no contact between the transducers 105 and the user's skin. Thus, in one embodiment, the transducers are not in contact with the skin and are instead arranged on an outer (or side) surface of the wearable structure 115 facing away from the arm or wrist. Additionally, the transducers may be arranged in a combination along an inner surface, an outer surface, or a side surface (e.g., as shown in FIG. 1) of the wearable structure 115. Additionally, in one embodiment, transducers 105 that are arranged along the inner surface of the wearable structure 115 facing the arm or wrist are encapsulated with a non-conductive material (e.g., foam, plastic, fiber, etc.) in order to explicitly prevent the transducers 105 from being in contact with the skin of the user.

Figure 2B:
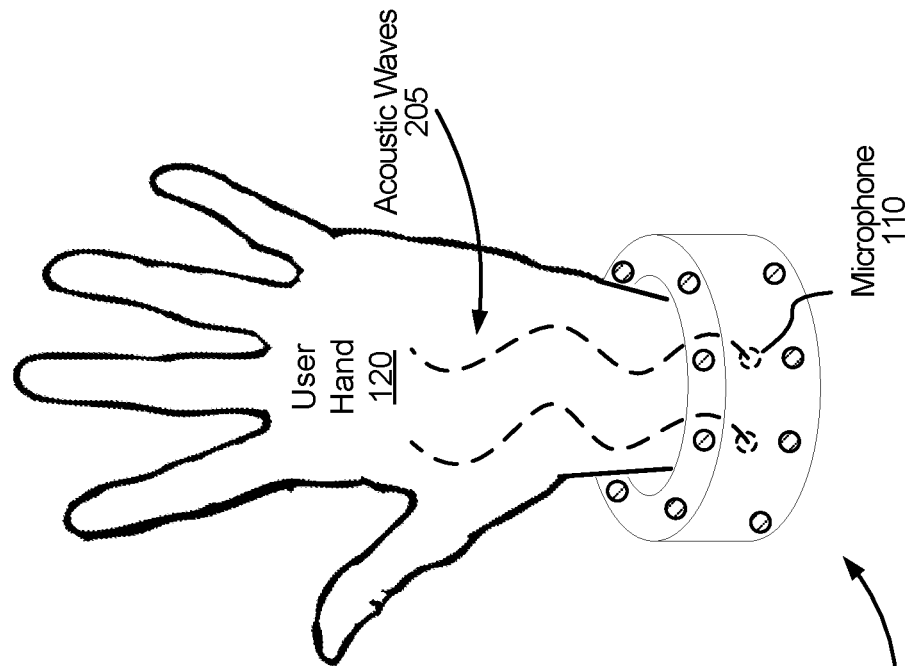
FIG. 2B is an example view of a wearable device with acoustic wave lines observed by one or more microphones of the wearable device in FIG. 1, in accordance with an embodiment.
Figure 2A:
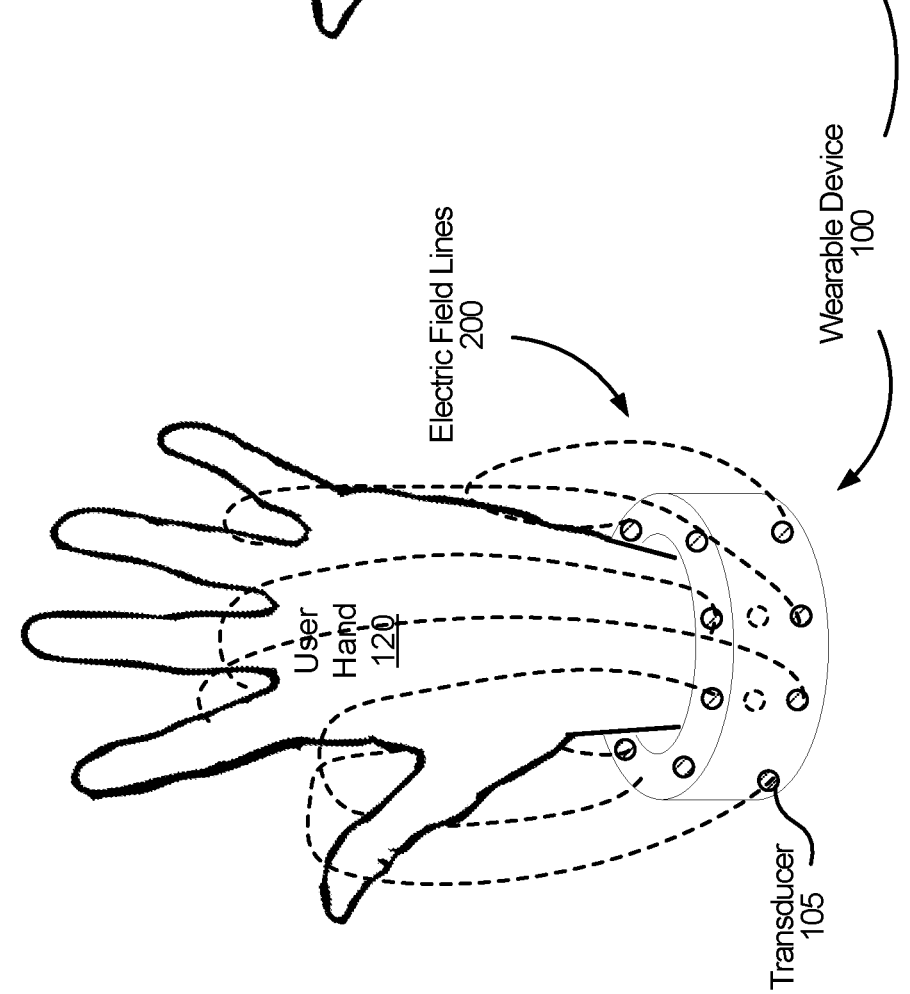
FIG. 2A is an example view of a wearable device with electric field lines generated by the transducers of the wearable device in FIG. 1, in accordance with an embodiment.

FIG. 2A is an example view of wearable device 100 showing electric field lines 200 of an electric field generated by the transducers 105, in accordance with an embodiment. Transducers 105 generate an electric field over the fingers and this electric field is altered as the user moves their wrist, hand, and/or fingers, which causes distortion of the electric field lines 200. In one embodiment, a controller circuit coupled to the transducers 105 detects changes in the impedance (e.g., capacitance, frequency and phase) along each channel corresponding to a receiver of one or more transducer 105 receiver/transmitter pairs. Since the impedance signature corresponding to the observed impedances across all channels (i.e., all transducer 105 receiver/transmitter pairs) for a particular hand pose is substantially repeatable each time the user makes the same hand pose, each unique impedance signature can be used to train a machine learning model that detects when the user makes a particular hand pose. Accordingly, the impedance signature can then be mapped to an input on a host device, such as a HMD.

FIG. 2B is an example view of acoustic wave lines 205 corresponding to acoustic waves propagating through tissue of the user's hand and these acoustic waves are observed by the microphones of the wearable device in FIG. 1, in accordance with an embodiment. The one or more microphones 110, in some embodiments, are also positioned on an inner surface of the wearable device 100 and are configured to detect acoustic waves propagating through tissue of the hand 120. In one embodiment, the microphones 110 are also arranged in a pattern along an inner surface of the wearable structure 115 to allow the microphones 110 to detect when the user makes a tapping gesture between fingers, touches another object, clenches their fist, and so forth. Any contact has the potential to causes acoustic vibrations through the issue of the user's hand and forearm and these acoustic vibrations or wave are detectable via the one or more microphones 110.

Additionally, two or more microphones 110 allow the wearable device 100 to triangulate the source of the acoustic waves traveling through the tissue of the user hand 120, which can, in some embodiments, aid the controller circuit in disambiguating the difference between the user tapping their thumb and index finger together relative to tapping their thumb and ring finger together, for example, and so forth. In this example, the acoustic wave signature (or combination of magnitudes received by each of the different microphones 110) may be sufficiently different to allow the controller circuit to determine whether the user is tapping their thumb and index finger together or whether the user is tapping their thumb and ring finger together.

Accordingly, the one or more microphones 110 provide the machine learning model with an additional input that can, in some embodiments, be used in conjunction with changes in the impedance to detect a particular hand gesture. For example, depending on the number of channels (i.e., transducers 105 operating as receivers) there may be multiple hand gestures with at least similar impedance signature and the additional input from the one or more microphones 110 may aid the model in disambiguating one hand gesture from another. Thus, the machine learning model can be trained on a combination of impedance signatures and acoustic wave propagation signatures to classify a number of hand gestures.

Figure 3:
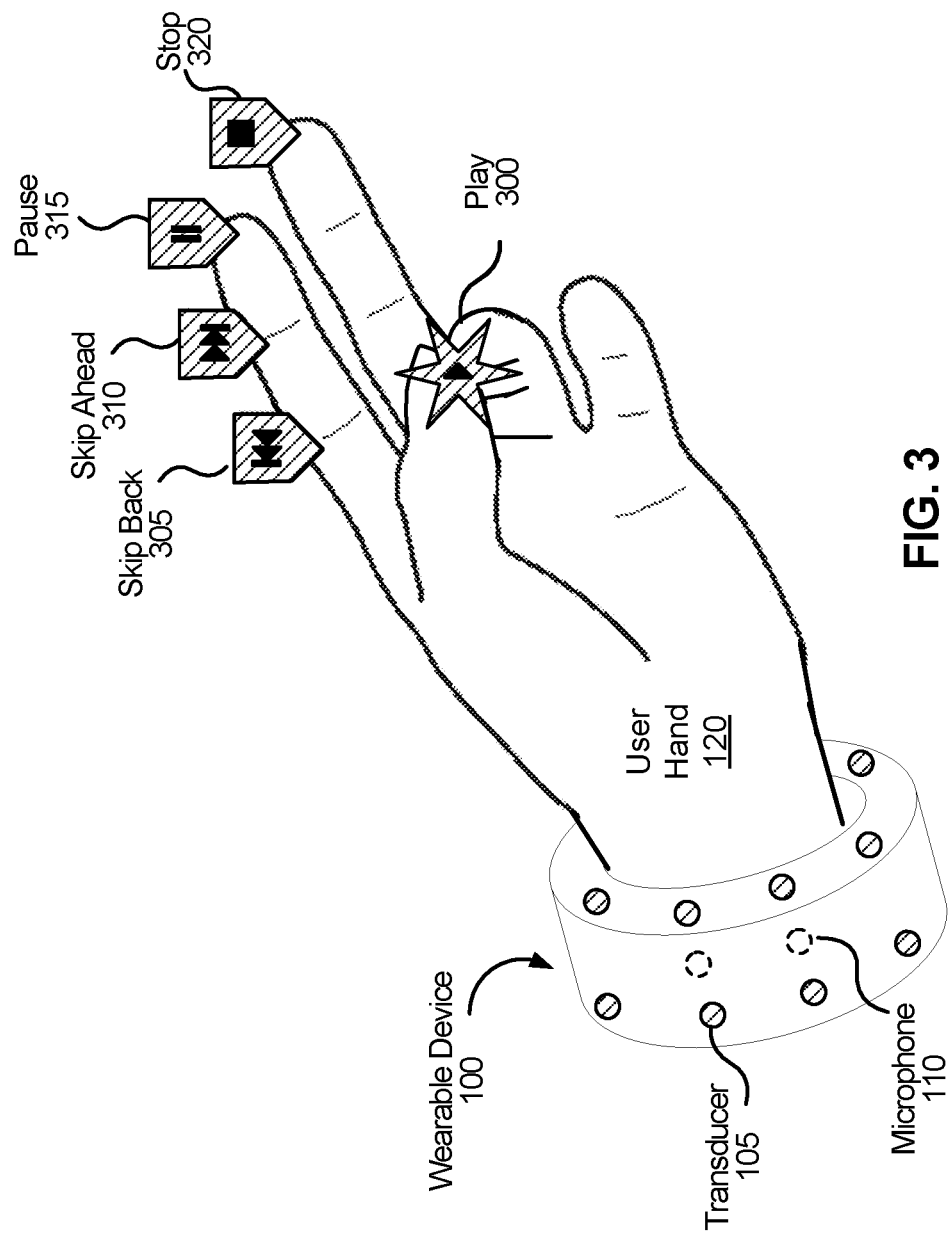
FIG. 3 is an example hand gesture used as an input to a host device for which the wearable device is configured to detect, in accordance with an embodiment.

FIG. 3 is an example hand gesture being used as an input on a host device for which the wearable device 100 is configured to detect, in accordance with an embodiment. In this example, the user hand 120 is making a play 300 gesture while wearing the wearable device in order to provide a play input to a host device, in accordance with various embodiments. Wearable device 100, in this example, is communicatively coupled to a HMD or other media player, such as an audio music device player, and makes the play 300 gesture to initial play of a video, virtual scene, music track, and so forth. Moreover, FIG. 3 shows a number of possible other inputs including a skip back 305 gesture, a skip ahead 310 gesture, a pause 315 gesture, and a stop 320 gesture. In order to make the play 300 gesture, in this example, the user taps or touches their thumb to their ring finger. Accordingly, in response to detecting a combination of conditions for the play 300 gesture (e.g., a combination of impedance signature and acoustic wave signature that uniquely identify the play 300 gesture), the wearable device 100 provides an input to the host device to play the corresponding media. Alternatively, information or data corresponding to the combination of impedance signature and acoustic wave signature could be provided to the host device or other intermediary device (e.g., game console, desktop computer, smartphone, etc.) that, using the machine learning model on the host device or other intermediary device, derives the play 300 gesture. Thus, wearable device 100 may not perform any computation locally and may merely forward data to another device to perform hand gesture identification.

Example System for Tracking a User's Hand Position

Figure 4:
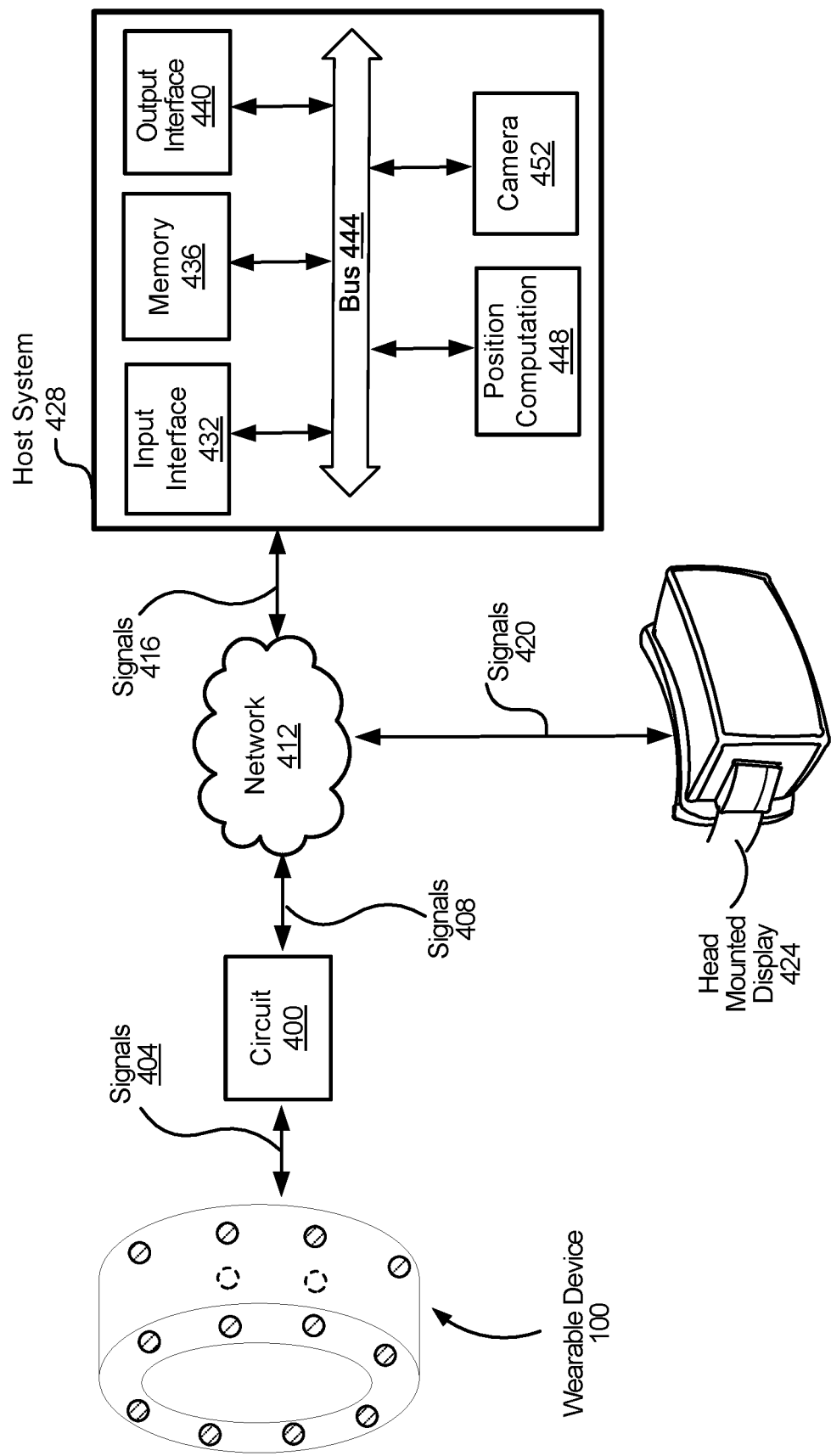
FIG. 4 is an example block diagram of a system for tracking a user's hand gesture, in accordance with an embodiment.

FIG. 4 is an example block diagram of a system for tracking a user's hand position in order to detect a hand gesture, in accordance with an embodiment. The system includes the wearable device 100, a host system 428, and a head-mounted display (HMD) 424. The wearable device includes transducers 105, microphones 110 and a circuit 400 coupled to the transducers 105 and/or microphones 110. The system illustrated in FIG. 4 may represent a virtual reality (VR) system, an augmented reality (AR) system, or a mixed reality (MR) system.

The transducers 105 transmit electric field (or impedance) measurements and/or acoustic wave signals 404 to the circuit 400 and the circuit 400 transmits signals 408 to the host system 428. Circuit 400 may, in some embodiments, merely forward electric field (or impedance) measurement and/or acoustic wave data to another device to perform hand gesture identification while not performing any computation locally on wearable device 100. Alternatively, the signals 408 may include information derived from the signals 404, or a computed output describing the impedance signature, the acoustic wave signature, the hand gesture made by of the user's hand 120 as calculated by the circuit 400, and so forth. The information derived from the signals 404 may include aggregate values based on the impedance signature, the acoustic wave signature, or a combination thereof.

In some embodiments, the computed output may be any discrete, discontinuous representation of information describing the hand gesture or hand position of the user's hand 120 or analog signals representing changes in the position of the user's hand 120 using a continuous function. The wearable device 100, host system 428, and HMD 424 may communicate via a network 412, which may include any combination of local area and/or wide area networks, using both wired and/or wireless communication systems.

The host system 428 may include an input interface circuit 432, a memory 436, an output interface circuit 440, and a controller 448. The input interface circuit 432, memory 436, output interface circuit 440, and controller 448 may communicate via a bus 444. The input interface circuit 432 receives the electric signals 408 from the circuit 400. The memory 436 may be organized as a database, table, file, etc., stored on one or more of memory cards and computer hard drives. In some embodiments, the memory 436 stores the machine learning model with information for determining the hand gesture of the user's hand 120.

The controller 448 is coupled to the input interface circuit 432. The controller 448 computes, using features extracted from the electric signals 408 as input to a machine learning model, an output that describes the hand gesture or position of the user's hand 120 and/or changes in hand position of the user's hand 120. The controller 448 may be part of a central processing unit (CPU) that carries out the instructions of a computer program by performing the basic arithmetic, logical, control and input/output (I/O) operations specified by the instructions.

In some embodiments, one or more components of the host system 428 shown in FIG. 4 are located in the HMD 424 or the wearable device 100. For example, the computation circuit 448 may be located in the circuit 400, which may be part of the wearable device 100 or the HMD 424.

The output interface circuit 440 is coupled to the controller 448 and transmits the computed output that describes the hand gesture. For example, if the output interface circuit 440 is included in the circuit 400, it will communicate the computed output to the host system 428 or the HMD 424. If the output interface circuit 440 is included in the host system 428, it will communicate the computed output to the HMD 424.

As discussed in greater detail below in connection with FIG. 5, the controller 448 includes a machine learning model training and/or inferencing. For example, the machine learning model can be trained using training data sets of example features extracted from electric signals from the transducers 105 and/or microphones 110, along with their corresponding expected outputs (e.g., a set of values defining the hand gesture). In some embodiments, at least a portion of the training data is generated in a training process, as described in detail below with reference to FIG. 5.

In some embodiments, the camera 452 may be a depth camera, a Red-Green-Blue (RGB) camera, an Infrared camera, or a camera mounted on the HMD 424. The camera 452 may capture images of the user's hand 120 by resolving distances based on the known speed of light or measuring the time-of-flight of a light signal between the camera and the user's hand 120 for each point of the image. The camera 452 may use independent charge coupled device (CCD) transducers to acquire the three RGB color signals for color image acquisitions of the user's hand 120. The camera 452 may be a thermographic camera (also called an Infrared camera or thermal imaging camera) that forms an image using infrared radiation using wavelengths as long as 14,000 nm (14 μm). In some embodiments, the camera 452 may capture ground truth hand positions for training data, as described below with reference to FIG. 5. Although the camera 452 may be used for training, it is not needed for inferencing changes in hand positions.

The HMD 424 is connected to the wearable device 100 and host system 428 via the network 412. The HMD 424 may include a display device, worn on a user's head or as part of a helmet that has an electronic display panel in front of the user's eyes to display computer-generated imagery (CGI) and/or live imagery from the physical world. The computed output that describes the hand position of the user's hand 120 generated from the signals 404 of the transducers 105 and microphones 110 may be translated into an action in a virtual scene or augmented reality items presented to the user by the display panel. The HMD 424 receives signals 420 from the network 412 that may be the signals 404 or the computed output corresponding to the hand position of the user's hand 120 after the circuit 400 or host system 428 has processed the signals 404 to determine the position of the user's hand 120. In another example, the HMD 424 receives a video feed including a virtual scene that is generated based at least in part on changes to the position of the user's hand.

The input interface circuit 432 may receive image signals from the camera 452 or a camera mounted on the HMD 424. In some embodiments, during a forward pass for training the machine learning model, the controller 448 may determine comparison signals by comparing the image signals with the computed output. For example, the controller 448 may use image differencing to determine changes between the image signals and the computed output for the values of joint orientations of the user hand shape model 280. The controller 448 may further determine an error or loss function for the difference between the hand position as derived from the image and hand position as derived from the machine learning model. In a backward pass, the parameters of the machine learning model are updated to minimize the loss or error function. For example, a gradient is computed with respect to the parameters of the machine learning model, and the parameters are optimized toward a negative gradient direction. In some embodiments, the error between the image signals and the computed output may be transformed into an image based on the result. For example, the Hutchinson metric may be used to measure a discrepancy between the image signals and the computed output. The output interface circuit 440 may further transmit the comparison signals to the host system 428 or HMD 424. Other types of machine learning may be used. In some embodiments, the machine learning model uses linear regression rather than gradient-based optimization.

As described above, computing the output that describes the hand position of the user's hand 120 from the signals 404 may be performed by the circuit 400, the host system 428, or circuits within the HMD 424 in different embodiments.

Example Machine Learning Training

Figure 5:
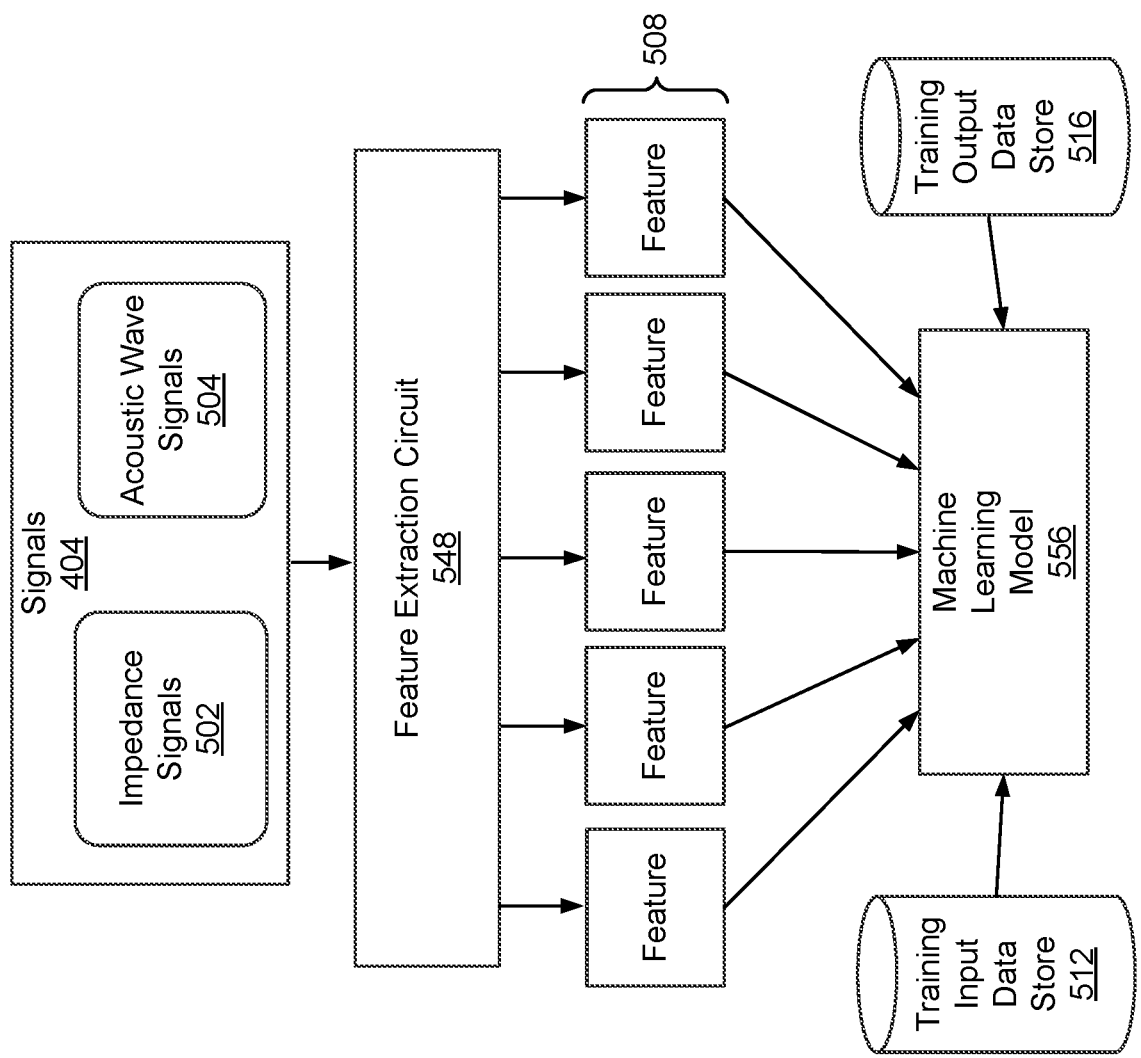
FIG. 5 is an example block diagram describing components associated with training a machine learning model for tracking a user's hand gesture, in accordance with an embodiment.

FIG. 5 is an example block diagram describing components associated with training a machine learning model 556, in accordance with an embodiment. In some embodiments, the process may have different and/or additional steps than those described in conjunction with FIG. 5. Some steps may be executed in parallel. Alternatively, some of the steps may be executed in parallel and some steps executed sequentially. Alternatively, some may execute in a pipelined fashion such that execution of a step is started before the execution of a previous step.

The block diagram illustrates a feature extraction circuit 548 and the machine learning model 556 within the controller 448. As described above, signals 404 include impedance signals 502 from the transducers 105 and acoustic wave signals 504 from the one or more microphones 110. Information derived from the signals 404, as described above with reference to FIG. 4, is received by the feature extraction circuit 548. The feature extraction circuit 548 extracts features 508 from the signals 404 or from the information derived from the signals 404. In this embodiment, the features 508 extracted are a set or combination of impedance and/or acoustic wave signal values for the transducers 105 and microphones 110 that representing different hand gestures.

During training of the machine learning model 556, the feature extraction circuit 548 extracts features 508 to facilitate adjusting the parameters of the machine learning model 556. The extracted features 508 are used as inputs to the machine learning model 556, whose output can be compared with ground truth outputs stored in the training output data store 516. In particular, the signals 404 or their extracted information is retrieved from the training input data store 512 and input to the feature extraction circuit 548 to generate the features 508.

The training input data store 512 may be organized as a database, table, file, etc., stored on one or more of removable or non-removable memory cards, computer hard drives, etc. In some embodiments, the training input data store 512 includes multiple data fields, each describing one or more attributes of the training input data. For example, the training input data store 512 may contain signals 404 and their extracted values, which are used as inputs to the feature extraction circuit 548. The training output data store 516 stores expected hand positions of the user's hand 120 that correspond with the inputs stored in the training data input store. In some embodiments, the training input data store 512 and training output data store 516 store information captured from multiple users.

The machine learning model 556 is trained using training sets including information from the training input data store 512 and the training output data store 516. The training output data store 516 may be organized as a database, table, file, etc., stored on one or more of removable or non-removable memory cards, computer hard drives, etc. The training output data store 516 may store associations between known features 508 and known hand gestures and/or hand positions corresponding to the features 508.

In some embodiments, the user's hand 120 whose position is to be tracked for training the machine learning model 556 is equipped with optical markers. Optical markers may be light reflectors (passive markers, e.g., retroreflectors) or light emitters (active markers, e.g., LEDs). To determine the orientation of the user's hand 120, several optical markers may be arranged at known geometries. A tracking camera may be used to scan and detect the light that comes from the optical markers. The images captured are processed to identify and calculate potential marker positions (in 2D image coordinates). This 2D data may be combined to calculate 3D positions of the optical markers. The results of such measurements (coordinates that describe the positions of the optical markers, and hence the position and orientation of the user's hand 120 carrying the markers) is stored in the training output data store 516 and used to train the machine learning model 556.

In some embodiments, the camera 452 generates image signals 520 corresponding to movement of the user's hand 120. A separate neural network may be trained to generate expected outputs derived from the image signals 520 that describe the hand position of the hand 120 of the wrist or arm 104 of the user. This process is described in U.S. application Ser. No. 15/487,355, filed Apr. 13, 2017, and U.S. application Ser. No. 15/487,361, filed Apr. 13, 2017, which are incorporated in their entirety herein by reference. These expected outputs may be stored in the training output data store 516. For example, the controller 448 may receive image signals 520 from the camera 452, as illustrated and described above with reference to FIG. 4, for training of the machine learning model 556. For each $N^2$ samples of impedance, the expected output corresponds to 8 camera frames representing captured changes in position of the hand 120 of the wrist or arm of the user. The controller 448 may also create training data sets for the training output data store 516 by receiving image signals 520 from a camera mounted on an HMD.

In some embodiments, the wearable device 100 includes an inertial measurement unit generates inertial signals corresponding to movement of the wearable device 100. The machine learning model 556 is trained to generate expected outputs derived from the inertial signals that describe the hand position of the hand 120 of the wrist or arm of the user. These expected outputs may be stored in the training output data store 516.

The objective of training the machine learning model 556 is to enable it to perform accurately on new, unseen inputs after having experienced the inputs and expected results of the training data sets. Several different approaches to training may be used, including decision tree learning, association rule learning, neural networks, deep learning, inductive logic programming, support vector machines, clustering, Bayesian networks, reinforcement learning, and representation learning, etc. In a gradient-based optimization approach, an error in a cost function (in a forward pass) and the gradient with respect to the parameters of the model may be computed; then the parameters may be moved towards the negative gradient direction (in a backward pass). In a neural network, there may be multiple layers of cost functions; the training is performed for each layer. In linear regression, closed form solutions are computed and the output may be directly written out.

In some embodiments, the training of the machine learning model 556 may be accomplished in two passes. First, in a forward pass, training features 508 are extracted from impedances and acoustic waves derived from the signals 404. In this manner, information derived from the signals 404 is input into the feature extraction circuit 548. The output of the feature extraction circuit 548 is the set of features 508. The features 508 correspond to angles between joints defining hand positions. In some embodiments, the features correspond to a reduced representation of a change in hand position of the hand 120 of the wrist or arm of the user. Each feature 508 is therefore an output extracted from a set of inputs 404. The controller 448 may determine an error or loss function between each feature 508 and the expected outputs (e.g., from camera 452) stored in the training data output store 516. Second, in a backward pass, the parameters of the machine learning model 556 are adjusted to minimize the error or loss function. In the next forward pass, this updated machine learning model 556 is used. In this manner, large volumes of training sets may be collected across multiple users.

In some embodiments, the machine learning model 556 may be a recurrent neural network (RNN) model, which is a class of artificial neural network where connections between units form a directed cycle. This creates an internal state of the machine learning model 556 which allows it to exhibit dynamic temporal behavior. In this embodiment, the controller 448 can use its internal memory to process arbitrary sequences of inputs, such as features extracted from the signals 404.

Example Process for Tracking Hand Position

Figure 6:
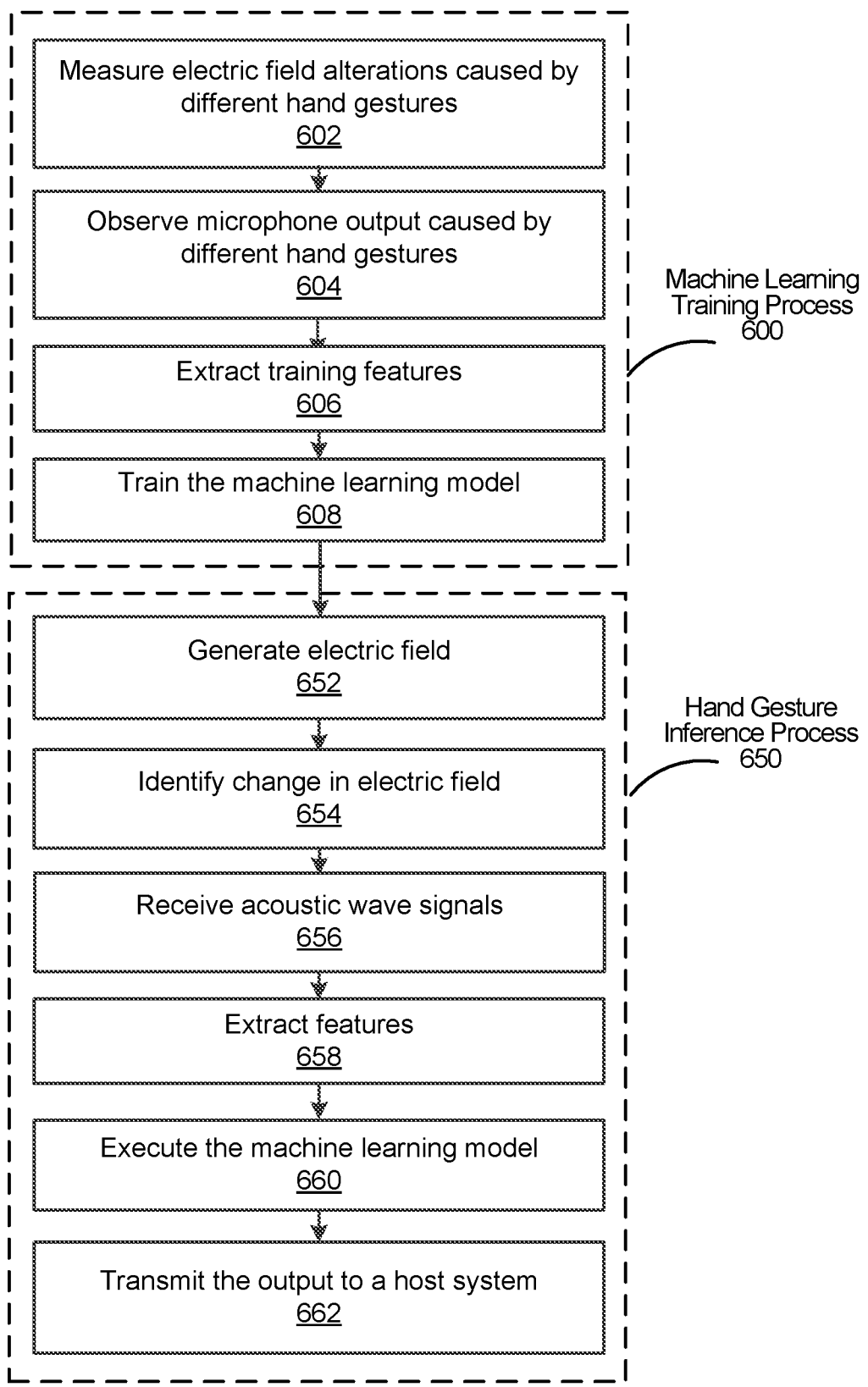
FIG. 6 is an example process for tracking a user's hand gesture, in accordance with an embodiment.

FIG. 6 is a flowchart illustrating a process 600 for training the machine learning model 556 to track the user's hand position based on training signals, and a process 650 for inferring the user's hand position or pose based on signals 404, in accordance with an embodiment. In some embodiments, the processes may have different and/or additional steps than those described in conjunction with FIG. 6. Steps of the processes may be performed in different orders than the order described in conjunction with FIG. 6. Some steps may be executed in parallel. Alternatively, some of the steps may be executed in parallel and some steps executed sequentially. Alternatively, some steps may execute in a pipelined fashion such that execution of a step is started before the execution of a previous step.

In the machine learning training process 600, the circuit 400 or host system 428 measures (or otherwise receives) 602 the signals 404 from the transducers 105 and microphones 110 arranged at different locations on the wearable structure 116 worn around at least a portion of a wrist or arm of the user. Each transducer 105 generates an electrical field and the receiver of each transducer 105 and detects alterations in the electric field caused by each of the different poses or gestures. In one embodiment, detecting alterations in the electric field is achieved by tracking changes in impedance across each transmitter/receiver pair of the transducer 105. Moreover, in various embodiments, the one or more microphones 110 observe 604 microphone acoustic wave information. At least a subset of the different gestures corresponding to different electric field alternations and, therefore, different impedances and acoustic wave signatures are received for each of the different poses or gestures.

The feature extraction circuit 548 extracts 606 training features 508 from the signals 404 for each of the different hand gestures. The features 508 extracted from the signals 404 or from the information derived from the signals 404 includes a set or combination of impedance and/or acoustic wave signal values for the transducers 105 and microphones 110 that representing different hand gestures.

The process 600 is a training process used to generate the machine learning model 556, such as by deriving parameters for neural network layers that implement the machine learning model 556. In the process 600, the machine learning model 556 is trained 608 using the extracted features 508, information corresponding to known hand positions from the training input data store 512, and expected outputs from the training output data store 516 to determine the hand position of a hand 120 of the user based on the features 508. Moreover, to create training sets, the controller 448, in some embodiments, may receive image signals 520 from the camera 452. Subsequent to the training process 600, the inferencing process 650 can be performed for real-time user hand tracking and gesture recognition. In one embodiment, the machine learning model is trained using the extracted training features to determine at least one of the subset of the different gestures based on the extracted training features of the different electric field alterations.

In the hand pose inference process 650, the transmitter of each of the transducers 105 in the wearable device 100 generates 652 an electric field. The input interface circuit 432 identifies 654 a change impedance from electric field values received from the transducers 105. The changes in the electric field values corresponding to movement of the user's hand or one or more fingers. Additionally, in various embodiments, the one or more microphones 110 receive 656 acoustic wave signals corresponding to a time associated with the change in impedance. For example, a particular acoustic wave signature may have a time stamp corresponding to a particular change in impedance or impedance value corresponding to a particular hand gesture.

The feature extraction circuit 548 extracts 658 features 508 from the impedance, electric field values, and/or acoustic wave values. The position computation component 448 transmits the features 508 for inferencing to the machine learning model 556 to generate 632 an output that describes a hand gesture. The machine learning model 556, having been trained using similar feature sets, is applied to the features 508 extracted during the inferencing.

In some embodiments, classifications, binaries, or other scores, based on the new features, are determined using the machine learning model 556. In some embodiments, a score associated with each user hand pose, position, or gesture in the training output data store 516 is determined. The score associated with each user hand pose, position, or gesture may indicate a likelihood that the impedance, electric field values, and/or acoustic pressure wave values (or a impedance signature and/or acoustic wave signature) correspond to that user hand position.

In some embodiments, a score associated with each user hand position is determined by evaluating an expression representing a weighted aggregate of scores associated with features 508. The weight associated with a feature may be predetermined, for example, configured by an expert user. Features that are most determinative of certain hand positions for a particular user may be weighted more. The output interface circuit 440 transmits 636 the computed output to the host system 428 or the HMD 424.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A system, comprising:
    a wearable device configured to be worn on a hand or wrist of a user, the wearable device comprising one or more transmitters and at least one receiver arranged at different locations on the wearable device, each of the one or more transmitters generating an electric field over fingers of the hand that is altered by changes in position one or more fingers of the hand relative to the wearable device; and
    a controller, coupled to the one or more transmitters and the at least one receiver, the controller configured to compute, using information derived from alterations in the electric field using a machine learning model, an output that describes the position of the one or more fingers of the hand of the user.

2. The system of claim 1, wherein the wearable device further comprises one or more microphones configured to detect one or more taps by the one or more fingers of the hand, hand-to-hand contact, or hand-to-object contact.

3. The system of claim 2, wherein the one or more microphones are positioned on an inner surface of the wearable device to detect the one or more taps, the hand-to-hand contact, or the hand-to-object contact by monitoring acoustic waves propagating through tissue of the hand.

4. The system of claim 3, wherein the controller is further configured to compute the output describing the position of the one or more fingers of the hand of the user using information derived from the one or more microphones using the machine learning model.

5. The system of claim 1, wherein the output that describes the position of the one or more fingers of the hand relative to the wearable device is a hand gesture made with the hand of the user.

6. The system of claim 1, wherein the machine learning model is trained by:
    observing alterations in the electric field caused by a plurality of different positions of the hand or of the one or more fingers in a training mode, at least a subset of positions of the one or more fingers corresponding to different electric field alternations;
    extracting training features from the subset of positions corresponding to the different electric field alternations; and
    training a machine learning model using the extracted training features to determine at least one of the position of the one or more fingers based on the observed alterations in the electric field and the corresponding plurality of different positions of the hand or of the one or more fingers in the training mode.

7. The system of claim 6, wherein observing the alterations in the electric field includes:
    detecting, by each of the at least one receiver, changes in impedance, each of the at least one receiver corresponding to a different signal channel.

8. The system of claim 6, wherein at least one of the subset of positions of the one or more fingers are each mapped to different inputs on an augmented reality or a virtual reality head mounted display (HMD).

9. The system of claim 1, wherein the controller is located on or within the wearable device.

10. The system of claim 1, wherein the controller is located on or within a host system external to the wearable device.

11. The system of claim 1, wherein the one or more transmitters and the at least one receiver are located on an outer or a side surface of the wearable device away from contact with skin of the user.

12. A wearable device configured to be worn on a hand or wrist of a user, comprising:
- a plurality of transducers arranged at different locations on the wearable device, each of the plurality of transducers generating an electric field over the hand of the user that is altered by different gestures performed with the hand by the user; and
- a controller, coupled to the plurality of transducers, configured to provide information for alterations in the electric field to a host device that, using a machine learning model, derives an output from the information for the alterations in the electric field that describes a gesture of the different gestures being performed by the user.

13. The wearable device of claim 12, wherein the plurality of transducers includes one or more transmitters and at least one receiver, and wherein the controller causes each transducer to selectively operate as a transmitter or as a receiver.

14. The wearable device of claim 13, wherein the wearable device further comprises one or more microphones positioned on an inner surface of the wearable device to detect one or more taps, hand-to-hand contact, or hand-to-object contact by monitoring acoustic waves propagating through tissue of the hand.

15. The wearable device of claim 14, wherein the controller is further configured to compute the output describing the gesture using information derived from the one or more microphones using the machine learning model.

16. The wearable device of claim 13, wherein the machine learning model is trained by:
- detecting alterations in the electric field caused by each of the different gestures in a training mode, at least a subset of the different gestures corresponding to different electric field alternations;
- extracting training features from the subset of the different gestures corresponding to the different electric field alternations; and
- training a machine learning model using the extracted training features to determine at least one of the subset of the different gestures based on the extracted training features of the different electric field alterations.

17. The wearable device of claim 13, wherein the host device is an augmented reality or a virtual reality head mounted display (HMD), and wherein each gesture is mapped to a different input of the augmented reality or the virtual reality HMD.

18. A method comprising:
- generating, by a wearable device, an electric field using a plurality of transducers arranged at different locations on the wearable device, the wearable device being configured to be worn on a wrist or hand of a user;
- detecting, by the wearable device, an alteration in the electric field corresponding to a change in position of the hand or one or more fingers of the hand relative to the wearable device;
- detecting, by the wearable device, acoustic waves propagating through tissue of the hand corresponding to one or more taps between fingers using one or more microphones positioned on an inner surface of the wearable device; and
- providing information for the detected alteration in the electric field and the detected acoustic waves propagating through the tissue of the hand to a host device that, using a machine learning model, derives an output describing a hand gesture corresponding to the position of the hand or the one or more fingers of the hand of the user.

19. The method of claim 18, wherein the machine learning model is trained by:
- observing alterations in the electric field caused by a plurality of different positions of the hand or of the one or more fingers in a training mode;
- observing acoustic wave propagation signatures through the tissue of the hand caused by the plurality of different positions of the hand or of the one or more fingers in the training mode, at least a subset of positions of the hand or of the one or more fingers corresponding to a different combination of the alternations in the electric field and acoustic wave propagation signatures;
- extracting training features from the subset of positions corresponding to the different electric field alternations and the acoustic wave propagation signatures; and
- training the machine learning model using the extracted training features to determine at least one of the position of the hand or one or more fingers based on the observed alterations in the electric field, the acoustic wave propagation signatures, and the corresponding plurality of different positions of the hand or of the one or more fingers in the training mode.

20. The method of claim 18, wherein detecting the alteration in the electric field includes:
- detecting changes in impedance via the plurality of transducers, at least one transducer operating as a receiver and each of the at least one transducer corresponding to a different signal channel.

* * * * *

UNITED STATES PATENT AND TRADEMARK OFFICE
CERTIFICATE OF CORRECTION

PATENT NO. : 10,877,558 B1  
APPLICATION NO. : 16/164640  
DATED : December 29, 2020  
INVENTOR(S) : Yi Zhao Page 1 of 1

It is certified that error appears in the above-identified patent and that said Letters Patent is hereby corrected as shown below:

In the Claims

Column 12, Line 49, Claim 6, delete "corresponding to different electric field alternations" and insert -- corresponding to different electric field alterations --.

Column 12, Line 51, Claim 6, delete "corresponding to the different electric field alternations;" and insert -- corresponding to the different electric field alterations; --.

Column 13, Line 44, Claim 16, delete "corresponding to different electric field alternations;" and insert -- corresponding to different electric field alterations; --.

Column 13, Line 47, Claim 16, delete "corresponding to the different electric field alternations;" and insert -- corresponding to the different electric field alterations; --.

Column 14, Lines 34-35, Claim 19, delete "to a different combination of the alternations in the" and insert -- to a different combination of the alterations in the --.

Column 14, Line 38, Claim 19, delete "corresponding to the different electric field alternations" and insert -- corresponding to the different electric field alterations --.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*